United States Patent

[11] 3,613,106

| [72] | Inventor | Erman V. Cavagnero<br>Torrington, Conn. |
|------|----------|------|
| [21] | Appl. No. | 886,081 |
| [22] | Filed | Dec. 18, 1969 |
| [23] | | Division of Ser. No. 706,217, Feb. 12, 1968, 3,522,644, which is a continuation-in-part of Ser. No. 473,948, July 22, 1965, abandoned |
| [45] | Patented | Oct. 12, 1971 |
| [73] | Assignee | Torin Corporation<br>Torrington, Conn. |

[54] PREHEATING AND SURFACE PREPARATION FOR WELDING
7 Claims, 3 Drawing Figs.

[52] U.S. Cl. ............................................ 219/105, 29/497, 219/67, 219/104
[51] Int. Cl. ..................................................... B23k 11/02
[50] Field of Search............................................ 219/103, 104, 105, 107, 64, 67, 101, 50; 29/494, 483, 488, 497

[56] References Cited
UNITED STATES PATENTS

| 1,439,962 | 12/1922 | Kamper........................ | 219/67 |
| 1,739,063 | 12/1927 | Crawford et al.............. | 219/67 |
| 2,028,096 | 1/1936 | Walker.......................... | 219/67 |
| 2,287,540 | 6/1942 | Vang............................ | 219/67 |
| 3,089,021 | 5/1963 | Howes et al. ................ | 219/104 |
| 3,210,840 | 10/1965 | Ulam............................ | 29/488 |
| 3,494,019 | 2/1970 | Teiji Ito et al................ | 29/483 |
| 3,500,532 | 3/1970 | Lozano........................ | 29/470.1 |

Primary Examiner—J. V. Truhe
Assistant Examiner—L. A. Schutzman
Attorney—McCormick, Paulding & Huber

ABSTRACT: A resistance upset butt welding method wherein surfaces are V-shaped and freshly exposed within seconds of welding.

PATENTED OCT 12 1971

3,613,106

*INVENTOR.*
ERMAN V. CAVAGNERO

BY
McCormick Paulding & Huber

ATTORNEYS

PREHEATING AND SURFACE PREPARATION FOR WELDING

CROSS-REFERENCE TO RELATED APPLICATIONS

This application is divided from U.S. application Ser. No. 706,217 entitled WELDING METHOD FOR BEARING RACES AND OTHER ARTICLES, filed Feb. 12, 1968, now Pat. No. 3,522,644, issued Aug. 4, 1970 which application was a continuation in part of copending U.S. Pat. application Ser. No. 473,948 filed July 22, 1965, now abandoned, and entitled METHOD FOR MAKING WELDED BEARING RACES AND OTHER ARTICLES.

It is an object of the present invention to provide an improved resistance upset butt welding method wherein end shaping, freshly exposed surfaces, and high welding pressures combine for highly efficient impurity removal and upset control.

Figures 1, 2, 3:
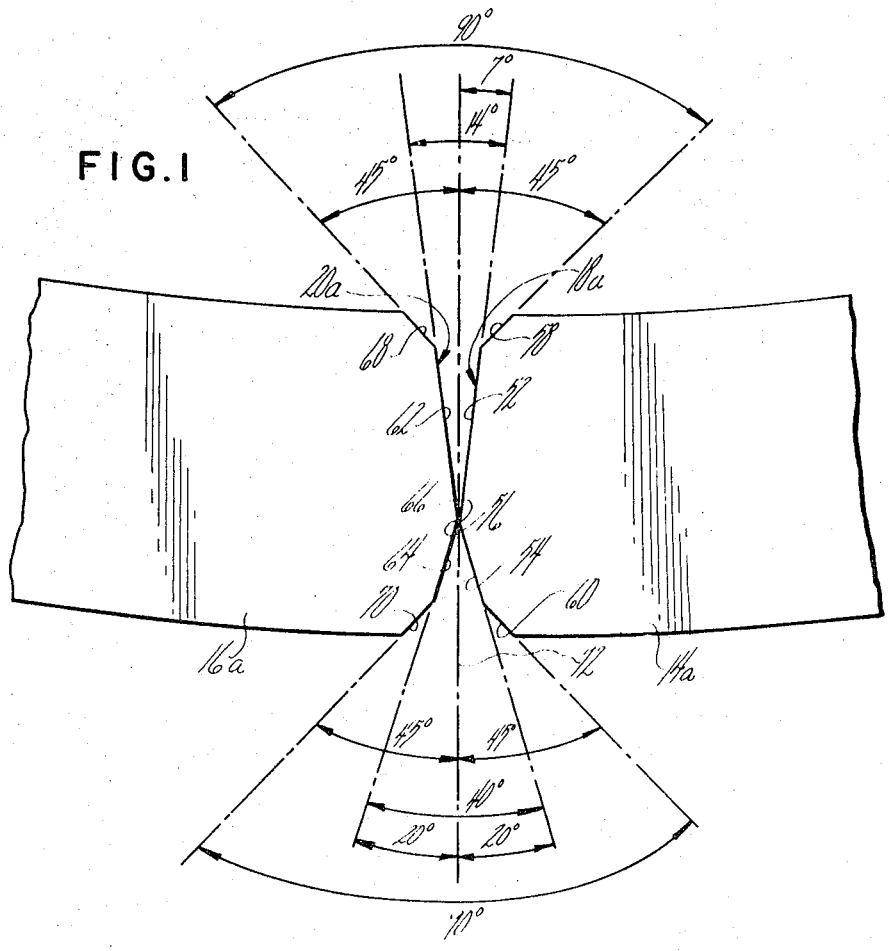
FIG. 1 is an enlarged somewhat schematic view showing the configuration of end surfaces of a bearing race.
FIG. 2 is a somewhat schematic view showing a bearing race and associated electrodes during preheating.
FIG. 3 is a somewhat schematic view showing a bearing race and associated electrodes during welding.

Referring particularly to FIG. 1, it will be observed that end portions 14a, and 16a representative of bearing races include end surfaces 18a, 20a in the form of generally V-shaped projections. Short outermost sections of the surfaces are cut back at angles substantially greater than the major portions of the surfaces. Thus, surface 18a comprises faces 52, 54 extending in opposite directions from apex 56 and short cutback outermost sections 58, 60. Similarly, the surface 20a has faces 62, 64 extending in opposite directions from apex 66 and short cutback outermost sections 68, 70. Faces 52, 62, extending from the apexes 56, 66 toward the internal surface of the race are each inclined approximately 7° from a normal plane 72 to define an included angle of 14° and the outermost cutback sections 58, 68 are each inclined approximately 45° from the plane 72 to define an included angle of 90°. Faces 54, 64, extending from the apexes toward the external surface of the race are each inclined approximately 20° from the plane 72 to define an included angle of 40° and the outermost sections 60, 70 are inclined at approximately 45° from plane 72 to define an included angle of 90°. The position of the apexes 56, 66, as shown, is considerably closer to the external surface of the race than the internal surface thereof and is approximately one-third of the total distance between said surfaces.

The shaping of end surfaces as described is an important aspect of the method of the present invention as applied particularly to resistance upset butt welding. Thus, in broad form, shaping may comprise the provision of at least one end surface with a generally V-shaped projection which may have a sharp or slightly flattened apex. Preferably, and as shown, each surface is provided with a V-shaped projection and the apexes thereof are engaged under substantial pressure with an electrical current passing through the area of engagement to weld progressively outwardly and to displace impurities progressively outwardly. Included angles between individual faces of the projections may vary, but it is believed that a range of 5° to 50° should be maintained for good results in weld strength, outward displacement of impurities, and control of upset. The illustrated inner and outer included angles of 14° and 40° provide excellent results in this regard and, together with the off-center positioning of the apexes 56, 66, such angles provide a particular upset condition which is desired in the present instance, i.e. substantially all of the upset occurs at the inner race surface with little or no upset at the outer surface. The provision of the short cutback sections 58, 68 and 60, 70 affords design freedom in the selection of desired included angles between the faces 52, 62 and 54, 64 and yet provides for upset control in the creation of additional void space for the reception of upset metal.

As will be apparent from the foregoing, extremely high pressures result at initial stages of welding due to the provision of substantial line contact between the surfaces to be welded. It is believed that welding pressures, calculated on the total cross-sectional area of the surfaces to be joined, should be maintained in the range between 10,000 pounds per square inch and 30,000 pounds per square inch and excellent results have been obtained in the example at hand with a pressure of approximately 15,700 p.s.i. At 15,700 p.s.i., calculated on total cross-sectional area, initial pressure with substantial line contact is of course extremely high and in the neighborhood of 1,500,000 pounds per square inch.

In FIGS. 2 and 3 bearing races are shown schematically in association with electrodes employed in resistance upset butt welding in accordance with the method of the invention. Thus, a bearing race 12 is shown in FIG. 2 with associated electrodes 100, 102 in engagement therewith for a preheating step, the end portions of the race being spaced apart to provide for current flow through a substantial rear or upper portion of the race with the end portions maintained relatively cold. In FIG. 3 the electrodes are again shown in engagement with race but with the end portions urged together whereby to provide for current flow through the relatively shorter path formed thereby and to accomplish welding together of the said end portions.

Factors of time are significant in the method of the present invention as indicated above. oxidation at surfaces to be welded of course results in detrimental effects on the completed weld and is to be avoided. While oxidation is somewhat slower at a relatively cold surface, it is nevertheless an important factor for consideration. Thus, the total time which elapses in preparation of surfaces such as 18a, 20a is of significance. Surface preparation steps may include a metal cutting operation which creates the surfaces 18a and 20a, a scraping operation or step, and a shaping step. The entire surface preparation step including all three operations or subsidiary steps should be limited in time. It is believed that a maximum time interval of 2 minutes between commencement of the surface preparation step and commencement of the welding step should be established. Further, 30 seconds is deemed a more realistic limit. In a commercial example, approximately 3 seconds will be consumed between commencement of the metal cutting operation and completion of welding. With such a 3-second time interval, it is believed that no problems of oxidation at the end surfaces 18a, 20a will be encountered.

The time lapse between completion of scraping and commencement of the preheating step will be less than 60 seconds, preferably less than 5 seconds, and will approximate 1 second. Thus, a clean, freshly exposed metallic surface will be presented for welding with little or no opportunity for oxidation or other contamination of the surface.

A very important time factor exists in connection with the interval between preheating and welding in the example set forth above. Oxidation at the end surfaces 18a, 20a must be prevented for a good weld and, in addition, cooling of the "remaining portion" by conduction to the relatively cool end portions 14a, 16a may result in localized "quenches" and the formation of "quench cracks" at a localized area or region or martensite if the time interval is too great. Thus, the preheating and welding steps must take place in rapid succession both for the prevention of oxidation at the end surfaces 18a, 20a and for the prevention of quench cracks and hard cracks. It is believed that no more than 1 minute should be permitted to pass in the interval between completion of preheating and the commencement of welding and a limit of 30 seconds is to be desired. In the present example, the bearing race was heated for approximately one-third of a second during preheating, an interval of approximately one-sixth of a second occurred between preheating and welding, and approximately one-fourth of a second was consumed in the welding step.

I claim:

1. A method for resistance upset butt welding two surfaces of one or more articles to be joined, said method comprising the steps of providing at least one of the surfaces with a generally V-shaped projection, selectively preheating the article or articles on which said surfaces reside while maintaining the said surfaces relatively cold with respect to the parts of the article or articles preheat to minimize oxidation, holding the surfaces in engagement, and welding the surfaces by passing an electrical current through the area of engagement therebetween to heat the same while urging the surfaces together under substantial pressure whereby to weld progressively outwardly and to displace impurities progressively outwardly from the initial area of engagement.

2. A method for resistance upset butt welding two surfaces as set forth in claim 1 wherein each of said surfaces is provided with a generally V-shaped projection, and wherein said surfaces are engaged at their apexes.

3. A method as set forth in claim 1 wherein said generally V-shaped projections have faces extending outwardly in opposite directions from their apexes in planes defining included angles between faces in the range between 5° to 50°, and wherein short outermost sections of said faces are cut back to reside in planes having substantially larger included angles therebetween.

4. A method as set forth in claim 1 wherein said surfaces are urged together during welding under a pressure in the range between 10,000 and 30,000 p.s.i. calculated on the total cross-sectional area at the joint.

5. A method as set forth in claim 4 wherein said pressure range extends from 12,000 to 20,000 p.s.i.

6. A method as set forth in claim 1 wherein said clean freshly exposed faces are provided within 2 seconds of commencement of welding.

7. A method as set forth in claim 1 wherein material is removed from said surfaces to provide clean freshly exposed surfaces within 5 seconds of commencement of welding.